United States Patent
Sharma (10) Patent No.: US 9,826,092 B2
(45) Date of Patent: Nov. 21, 2017

(54) METHOD AND SYSTEM FOR CALL QUEUE MESSAGING

(71) Applicant: Sundip Sharma, Bangalore (IN)

(72) Inventor: Sundip Sharma, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 14/870,814

(22) Filed: Sep. 30, 2015

(65) Prior Publication Data
US 2017/0041464 A1    Feb. 9, 2017

(30) Foreign Application Priority Data
Aug. 5, 2015 (IN) .............................. 859/KOL/2015

(51) Int. Cl.
*H04M 3/428* (2006.01)
*H04M 3/523* (2006.01)
*H04M 3/42* (2006.01)
*H04M 3/436* (2006.01)

(52) U.S. Cl.
CPC ..... *H04M 3/4285* (2013.01); *H04M 3/42068* (2013.01); *H04M 3/436* (2013.01); *H04M 3/523* (2013.01); *H04M 3/5238* (2013.01)

(58) Field of Classification Search
CPC ............. H04M 3/523; H04M 3/42068; H04M 3/4285; H04M 3/436; H04M 3/5238
See application file for complete search history.

(56) References Cited

U.S. PATENT DOCUMENTS

| | | | | |
|---|---|---|---|---|
| 6,195,426 B1* | 2/2001 | Bolduc | ............... | H04M 3/4285 379/265.02 |
| 6,233,332 B1* | 5/2001 | Anderson | ........... | H04M 3/5233 379/242 |
| 6,377,944 B1* | 4/2002 | Busey | ............... | G06F 17/30867 |
| 6,999,990 B1* | 2/2006 | Sullivan | ............... | G06F 9/4446 709/204 |
| 8,175,255 B2* | 5/2012 | Ruckart | ............. | H04M 3/5231 379/265.09 |
| 8,380,783 B1* | 2/2013 | Jones | ................... | H04L 65/1053 370/352 |
| 8,571,203 B2* | 10/2013 | Knott | ................ | H04M 3/42348 379/265.01 |
| 8,744,062 B2* | 6/2014 | Pickford | ............. | H04M 3/5175 379/265.02 |
| 8,755,510 B2* | 6/2014 | Erbey | .................. | G06Q 30/016 379/265.02 |
| 9,001,991 B1* | 4/2015 | Roper | ..................... | H04M 3/26 379/265.01 |
| 9,270,826 B2* | 2/2016 | Conway | .............. | H04M 3/5232 |

(Continued)

*Primary Examiner* — Lisa Hashem
(74) *Attorney, Agent, or Firm* — Osha Liang LLP (57) ABSTRACT

A method for providing messages to a user during a call includes receiving a call from a user. The method may further include retrieving, based on the call, a unique identifier of the user, and placing the user in a call queue in an order defined by when the call is received. While the user is in the call queue, user data matching the unique identifier of the user is retrieved, the user data is analyzed to identify, based on the prior interaction, a problem of the user with the software application. The method may further include generating, in response to identifying the problem of the user, user data messages, and initiating presentation of the user data messages to the user while the user is in the call queue.

16 Claims, 6 Drawing Sheets

(56) References Cited

U.S. PATENT DOCUMENTS

| | | | |
|---|---|---|---|
| 9,286,471 B2* | 3/2016 | Qureshi | G06F 21/53 |
| 9,621,733 B2* | 4/2017 | Lawson | H04M 7/0033 |
| 2004/0057572 A1* | 3/2004 | O'Connor | H04M 3/5233 |
| | | | 379/266.01 |
| 2005/0207559 A1* | 9/2005 | Shtivelman | H04M 3/5238 |
| | | | 379/266.06 |
| 2005/0233733 A1* | 10/2005 | Roundtree | G06F 9/45512 |
| | | | 455/414.1 |
| 2007/0265873 A1* | 11/2007 | Sheth | G06Q 30/016 |
| | | | 705/304 |
| 2007/0266371 A1* | 11/2007 | Ramakrishnan | G06F 8/68 |
| | | | 717/121 |
| 2008/0098382 A1* | 4/2008 | Declercq | G06Q 30/02 |
| | | | 717/170 |
| 2009/0028302 A1* | 1/2009 | Chang | H04M 3/493 |
| | | | 379/88.04 |
| 2010/0205583 A1* | 8/2010 | Gebhardt | G06F 11/366 |
| | | | 717/127 |
| 2013/0018803 A1* | 1/2013 | Challu | G06Q 10/06 |
| | | | 705/304 |
| 2013/0051546 A1* | 2/2013 | Fried | H04M 3/5231 |
| | | | 379/265.02 |
| 2015/0256676 A1* | 9/2015 | Famous | H04M 3/42068 |
| | | | 379/265.09 |
| 2016/0370952 A1* | 12/2016 | Karnewar | G06F 3/0482 |

* cited by examiner

METHOD AND SYSTEM FOR CALL QUEUE MESSAGING

CROSS-REFERENCE TO RELATED APPLICATIONS

This application claims priority under 35 U.S.C. 119(a) to Indian Patent Application No. 859/KOL/2015, filed on Aug. 5, 2015, and entitled "METHOD AND SYSTEM FOR CALL QUEUE MESSAGING," which is also assigned to the assignee of the present application.

BACKGROUND

In general, when customers have questions or issues regarding a product, the customers will call the customer service hotline for assistance. At certain times, a customer service center may experience an influx of callers that exceeds the number of human representatives to handle such calls. In such a scenario, the users are placed in a call queue and provided with only generic messages common to all users, such as, "The current wait time is X to speak to a representative."

SUMMARY

In general, in one aspect, the invention relates to a method for providing messages to a user during a call. The method includes receiving a call from a user. The method may further include retrieving, based on the call, a unique identifier of the user, and placing the user in a call queue in an order defined by when the call is received. The method may further include, while the user is in the call queue, retrieving user data matching the unique identifier of the user. The user data may describe a prior interaction with a software application. While the user is in the call queue, the method may further include analyzing the user data to identify, based on the prior interaction, a problem of the user with the software application, and generating, in response to identifying the problem of the user, user data messages. At least one of user data messages may address the problem of the user. The method may further include initiating presentation of the user data messages to the user while the user is in the call queue.

In general, in one aspect, the invention relates to a system for providing messages to a user during a call. The system may include a call center system configured to receive a call from a user, retrieving, based on the call, a unique identifier of the user, and placing the user in a call queue in an order defined by when the call is received. The system may further include an application server operatively connected to the call center system. The application server may be configured to, while the user is in the call queue, retrieve user data matching the unique identifier of the user. The user data may describe a prior interaction with a software application. While the user is in the call queue, the application server may further be configured to analyze the user data to identify, based on the prior interaction, a problem of the user with the software application, and generate, in response to identifying the problem of the user, user data messages. At least one of the user data messages may address the problem of the user. The application server may further be configured to initiate presentation of the user data messages to the user while the user is in the call queue.

In general, in one aspect, embodiments relate to a non-transitory computer readable medium (CRM) storing various instructions for providing messages to a user during a call. The instructions include functionality for receiving a call from a user. The instructions further include functionality for retrieving, based on the call, a unique identifier of the user, and placing the user in a call queue in an order defined by when the call is received. The instructions further includes functionality for, while the user is in the call queue, retrieving user data matching the unique identifier of the user. The user data may describe a prior interaction with a software application. While the user is in the call queue, the instructions further include functionality for may further include analyzing the user data to identify, based on the prior interaction, a problem of the user with the software application, and generating, in response to identifying the problem of the user, user data messages. At least one of user data messages may address the problem of the user. The instructions further include functionality for initiating presentation of the user data messages to the user while the user is in the call queue.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a method, a system, and a computer readable medium for providing messages to a user on hold during a call. The messages may be user data messages, and may be generated using data specific to the particular user that are designed to address a problem that the user has with a software application. Consequently, the user data messages presented to the user may include content specific to the particular user and may obviate the need for the user to remain on hold in the call queue. However, in case the data messages do not address the user's problem or the user still desires to speak with a call center agent, one or more embodiments keep the user in order in the call queue until the user ends the call, requests transfer, or is transferred to the call center agent.

Figure 1:
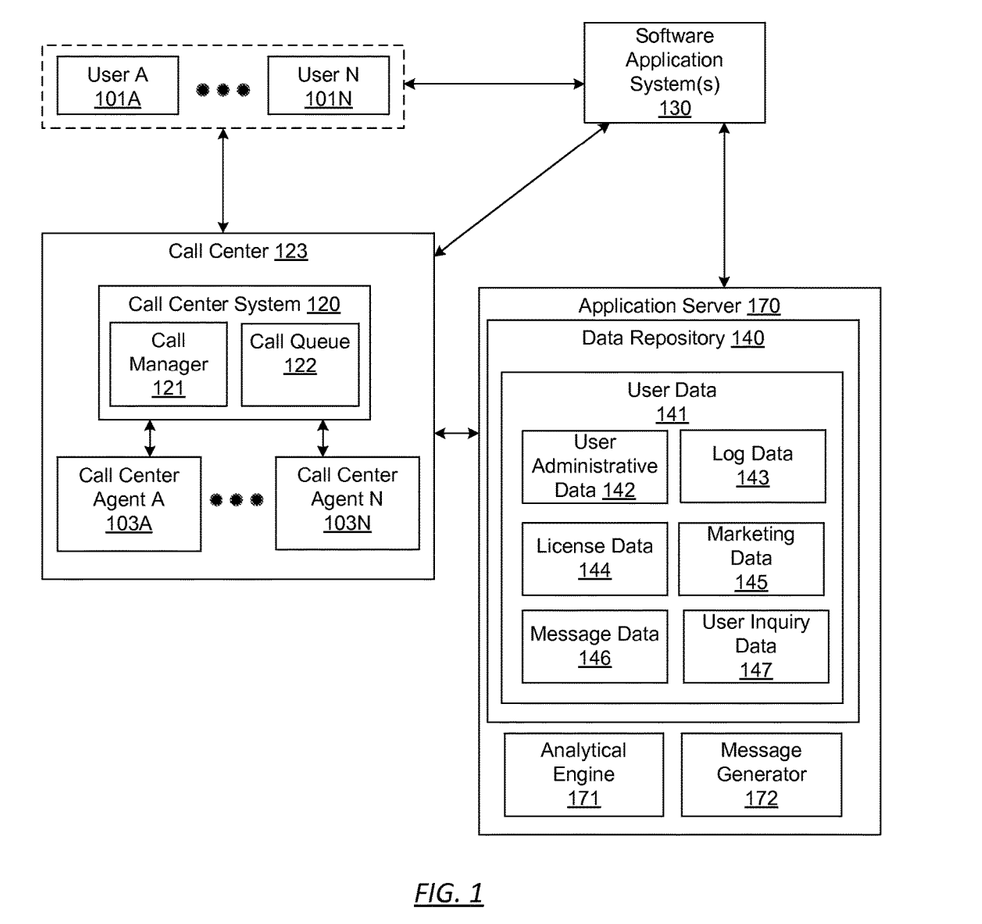
FIG. 1 shows a schematic diagram of a system in accordance with one or more embodiments of the invention.

FIG. 1 shows a system in accordance with one or more embodiments of the invention. As shown in FIG. 1, in accordance with one or more embodiments of the invention, the system includes one or more users (e.g., user A (101A), user N (101N)), one or more software applications (130), a call center (123), one or more call center agents (e.g., call center agent A (103A), call center agent N (103N)), and an application server (170). FIG. 1 shows logical communicative connections between components. The actual connections between the various components of FIG. 1 may be direct or indirect, wired or wireless, or any combination thereof. For example, the components may be connected via direct wired connections, phone networks, the Internet, or any other type of connection or combination. In one or more embodiments, software application systems (130) may be operated on a mobile phone, a desktop computer, a laptop computer, a tablet, or any other device configured to operate as described herein. In one or more embodiments, the components of FIG. 1 may transmit data via the connections. Each of the components of FIG. 1 is described below.

In one or more embodiments of the invention, a user users (e.g., user A (101A), user N (101N)) is any entity that uses a software application system (130) and contacts a call center (123). For example, a user may be an individual, a family, a company or department of a company, a business entity, an organization, or any other entity. In one or more embodiments of the invention, a user, as used herein, is deemed to performed an action when the agent of the user performs an action for the user. For example, an employee of a company may use the software application system and an information technology (IT) specialist may contact the call center to address any problems that the employee has with the software application system. In such a scenario, the user may be deemed to be the employee or company that is deemed to have contacted the call center through the IT specialist.

Continuing with FIG. 1, a user (e.g., user A (101A), user N (101N)) may operate a software application system (130) in accordance with one or more embodiments. A software application system (130) is any computing device that executes a software application. For example, the software application system may be a local computing device of the user, a remote computing device to the user, or a combination of local and remote. A software application is a set of instructions, that, when executed on a computer processor, performs a function. For example, the software application may be a word processing application, a financial application, an inventory management application, a gaming application, or any other software. Further, the software application may be integrated with the software application system (130). For example, the software application system may be or include specialized hardware for executing the software application.

Continuing with FIG. 1, the application server (170) is connected to the software application system(s) (130) and call center (123) (discussed below). In one or more embodiments, the application server (170) is a combination of hardware and software configured to analyze user data and generate user data messages. Further, the application server (170) may include multiple different hardware units and/or devices. The multiple hardware units and/or devices may or may not be of the same type or located at the same physical site. In one or more embodiments, the application server (270) is a specialized computer of the type described below in connection with FIG. 6. In one or more embodiments of the invention, the application server (170) includes a data repository (140), an analytical engine (171), and a message generator (172). Each of these components is described below.

In one or more embodiments of the invention, the data repository (140) is any type of storage unit and/or device (e.g., a file system, database, collection of tables, or any other storage mechanism) for storing data. Further, the data repository (140) may include multiple different storage units and/or devices. The multiple different storage units and/or devices may or may not be of the same type or located at the same physical site. In one or more embodiments of the invention, the data repository (140) includes functionality to store user data (141). In one or more embodiments of the invention, user data (141) is any data that is specific to a user. More particularly, user data (141) is data that describes a user's interaction with the software application, which is specific to the user as opposed to generic to all users. In one or more embodiments of the invention, the user data (141) is individually stored for each user and distinct in storage from user data for other users. For example, the user data may be maintained as one or more distinct records, separate from other users' records, in one or more databases. Although only single user data (141) is shown, multiple user data may exist for multiple users.

In one or more embodiments of the invention, the user data (141) may include user administrative data (142), log data (143), license data (144), marketing data (145), message data (146) and user inquiry data (147). Each of the particular type of user data may be maintained and gathered by distinct servers and corresponding software. For example, user administrative data (142) and license data (144) may be gathered by a registration server (not shown), log data (143) may be gathered by a client on the software application system (130) communicating with a log server (not shown), message data (146) may be gathered by the call center (123), etc. Thus, each portion of the user data may be maintained separate from other portions and in a heterogeneous manner. Each of the particular types of user data are described below.

In one or more embodiments of the invention, the user administrative data (142) may include any personal information regarding a user. For example, user administrative data (142) may include, but is not limited to, unique identifier of the user, email address, phone number, home address, work address, etc. The unique identifier is an identifier that is unique to the user amongst users in the system. Further, the unique identifier may be a single identifier (e.g., social security number, phone number, or assigned alphanumeric string) or combination of identifiers (e.g., name and address).

In one or more embodiments of the invention, the log data (143) may include log files regarding a user's usage of one or more software applications (130). In general, the log data (143) may log any issues that a user may be having. For example, log files (143) may include, but is not limited to, log files that are generated whenever a user experiences an error, a crash, or a fault during usage of a software application. By way of another example, the log data (143) may log all usage of the software application by the user. In such an example, the level of detail in the log data that is kept may be based on whether an error is present. The log file may be automatically uploaded to the application server (170) by the software application (130) for storage in log data (143).

In one or more embodiments of the invention, the license data (144) may include information regarding the license of the software application. For example, license data (144) may include, but is not limited to, software application license type, software application purchase date, software application license expiry date, software application version, software application edition, other information or any combination thereof.

In one or more embodiments of the invention, the marketing data (145) may include any information regarding a user's usage of a variety of products and/or software applications for the purposes for promotion and/or for marketing purposes. For example, marketing data (145) may include, but is not limited to, data regarding a user's product usage, statistics, demographics, marketing preferences, and any other marketing data or any combination thereof.

In one or more or more embodiments, the message data (146) may include the user data messages and/or references to user data messages that are generated by the message generator (172). For example, message data (146) may include, is not limited to, user data messages that may be presented to a user waiting in a call queue. In other words, the message data may include past user data messages already presented to the user and current user data messages for the user. The message data may be stored as complete user data messages or references to user data messages. For example, each user data message may be related, in the data repository (140), to a unique message identifier. By way of some examples, the user data messages may inform the user that they are using an out of date version of a software application, and the crash of the software application that the user is experiencing is resolved in the new version of the software application. The user data message may also prompt the user if they would like a link to the webpage of the updated software application where the user may download the update. In such a scenario, the application server (170) may be configured to send an email including a link to the webpage of the updated software application to the user's email address.

In one or more or more embodiments, the user inquiry data (147) may include any information that is obtained from the user regarding any problems of the user. In other words, user inquiry data (147) is information that the user provides independent of the software application regarding usage of the software application. For example, user inquiry data (147) may include, but is not limited to, a survey that a user provides describing their experiences regarding usage of a particular software application. In another example, a user may be having an issue when using a particular software application, and may write an email to the troubleshooting department of the company of the software application detailing any concerns they may have regarding their usage and/or issue. By way of other examples, the user inquiry data may be data describing past communication between the user and the call center agent (e.g., entered by the call center agent), data describing user's interaction with a troubleshooting web site to troubleshoot usage of the software application, user's text communication using a chat application regarding the software application, and other information from a user.

Continuing with the application server, in one or more embodiments of the invention, the analytical engine (171) includes functionality to analyze the user data (141) to identify a problem of a user. The analytical engine include functionality to use data mining from various servers that may be internal or external to the application server (170). In one or more embodiments, the message generator (172) may include functionality to generate one or more user data messages for the user. The message generator (172) may be configured to assign a priority value to each user data message. The priority value may be a weight for each message according to the priority and/or importance of a particular message. In one or more embodiments, the user data messages may be presented to a user in accordance with the priority value of each message.

Continuing with the application server (170), the application server (170) may include functionality to automatically update a user's respective user data (141) based on a user's (e.g., user A (101A), user N (101N)) usage of a software application (130). Furthermore, the application server (170) may update details regarding the user data messages (146) based on the user's usage of a software application and/or information provided by the user.

In one or more embodiments, the call center (123) may be any entity configured to communicate with one or more users. The communication with the users may be via a chat, telephone, or other medium for communication. The call center (123) includes a call center system (120) and call center agents (e.g., call center agent A (103A), call center agent N (103N)). In general, the call center system (120) is a computing device that includes functionality to manage calls from users. In particular, the call center system (120) may be configured to perform and receive calls with one or more users, and connect the users for communication with one or more call center agents. In one or more embodiments of the invention, the call center agent is a human being. The call center agent may be trained to troubleshoot the various user's technical problems.

In one or more embodiments, the call center system (120) includes a call queue (122) and a call manager (121). The call queue (122) is an ordered queue that maintains a list of users on hold that are waiting to speak with a call center agent. In one or more embodiments of the invention, the call queue may order the users in an order in which the call is received at the call center (123). In some embodiments, certain users may be placed ahead in the queue based on a priority status of the user. Thus, the call queue (122) may not be a perfect ordering of calls in the order of receipt. The call queue may maintain other orderings without departing from the scope of the invention. In one or more embodiments of the invention, the call queue (122) maintains the calls using an ordered list of unique identifiers for each call. Further, more than one call queue may exist without departing from the scope of the invention. As used in this application, a user or call is in the call queue when the identifier for the call is in the call queue.

In one or more embodiments of the invention, the call manager (121) includes functionality to manage the calls. In particular, the call manager (121) includes functionality to receive a call, place the call in the call queue, transfer the call to the call center agent according to the order of the call queue. Further, the call manager (121) includes functionality to obtain user data messages from the application server and present the user data messages to the users in the call queue.

While FIG. 1 shows a particular configuration of components, other configurations may be used without departing from the scope of the invention. For example, various components may be combined to create a single component. As another example, the functionality performed by a single component may be performed by two or more components. By way of a more specific example, the application server (170) may be multiple servers managed by distinct entities. In another example, the message generator (172) may be a part of the call center (123).

Figure 2:
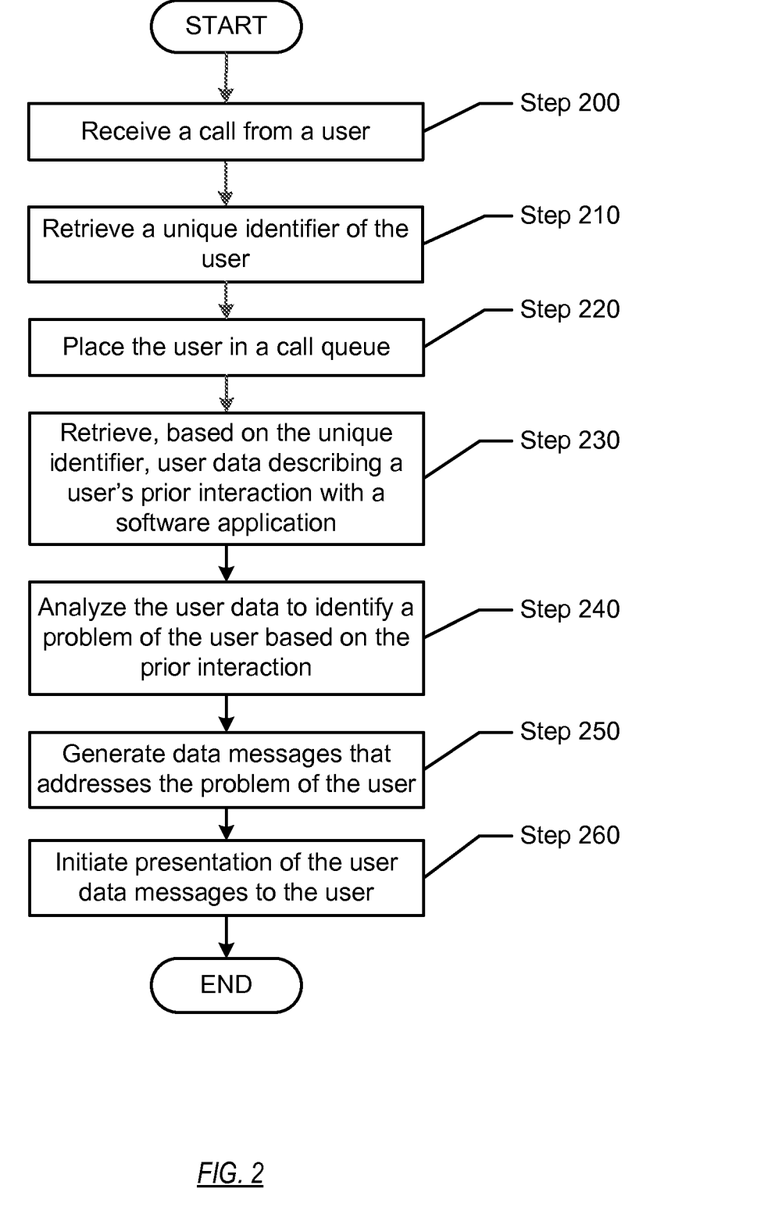
FIGS. 2, 3, and 4 show flowcharts in accordance with one or more embodiments of the invention.
Figure 3:
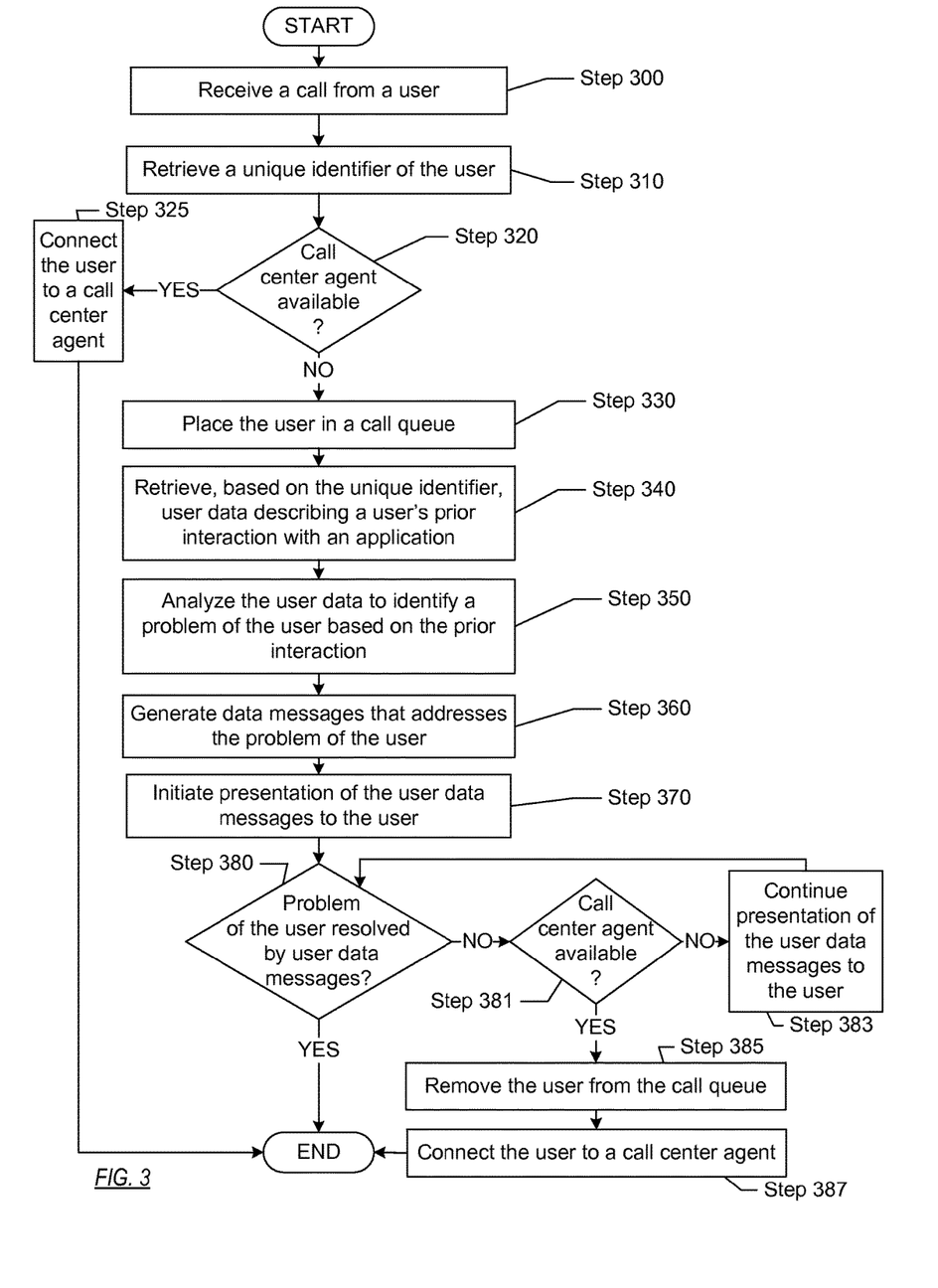
Figure 4:
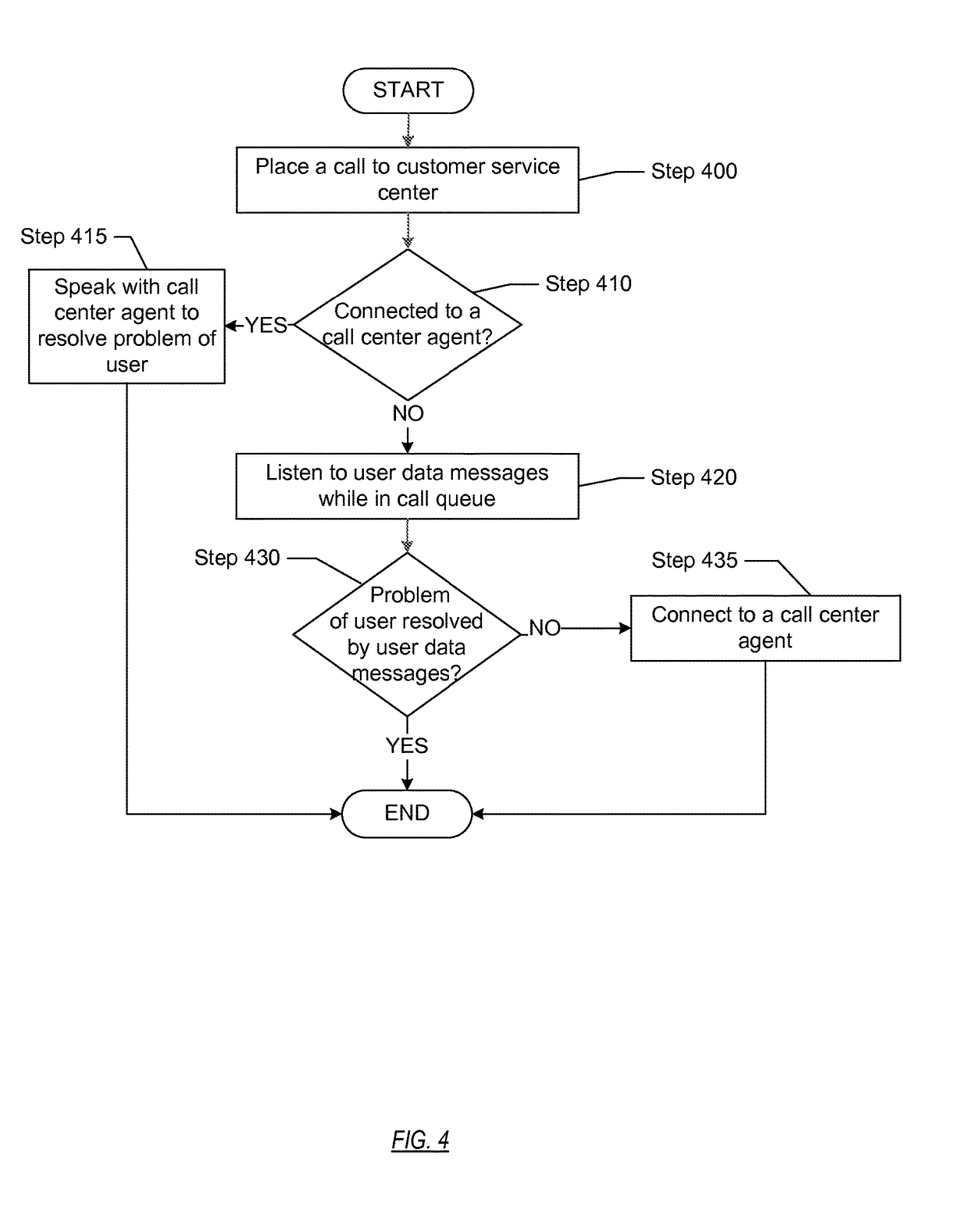

FIGS. 2, 3, and 4 show flowcharts in accordance with one or more embodiments. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively.

FIG. 2 shows a flowchart in accordance with one or more embodiments for a method for providing messages to a user on hold during a call. In Step 200, a call center may receive a call from a user. In one or more embodiments, for example, the call may be received as a phone call through a landline and/or a cellular phone, through the Internet, or another computer network. The call may be a video call. The call may be text based, such as a chat session. In some embodiments, the call is deemed received when the user requests communication with a call center agent. For example, in an online chat session, the user may select a button to connect to the call center agent.

In Step 210, a unique identifier of the user may be retrieved in accordance with one or more embodiments of the invention. In one or more embodiments, the phone number of the user that is calling in to the call center is identified and matched with a phone number stored within the user administrative data of the application server. The unique identifier of the user may be obtained from the administrative data. In some embodiments, the phone number is the unique identifier. In some embodiments, an automated message is presented to the user that prompts the user to provide a unique identifier. Thus, the user may submit the unique identifier to the call manager.

In Step 220, the user may be placed into a call queue managed by a call manager. For example, if the number of users calling in to the call center exceeds the number of available call center agents to tend to the users, one or more users may be placed into the call queue. Placing the user in the call queue may include putting a unique identifier of the call in the call queue. For example, in the case of a chat session, the unique identifier may be the session identifier that is placed in the call queue. In the case of a phone call, the unique identifier of the call may be an identifier assigned to the call on receipt of the call.

In Step 230, user data describing the user's prior interaction with a software application is retrieved based on the unique identifier of the user. In one or more embodiments of the invention, the call manager may transmit the unique identifier to the application server. In response, the application server gathers log files, licensing data, messaging data, user inquiry data, and other data matching the unique identifier of the user. In some embodiments, different unique identifiers may be used to gather the data. For example, the user administrative data may be associated with a unique identifier corresponding to the user's name and address, the user inquiry data may be associated with the user's phone number, the marketing data may be related to the user's email address, and so forth. In such a scenario, retrieving user data may include determining for each storage unit, the type of unique identifier (e.g., name and address, phone number, email address, etc.) to access the user data from the storage unit, obtaining the unique identifier matching the type from prior retrieved data or a data record associated with the user, and retrieving the user data matching the unique identifier.

In Step 240, the user data is analyzed to identify a problem of the user based on the prior interaction. In other words, data mining is applied to the user data in order to predict the problem that triggered the call to the call center. The following is an example of how the data may be used. The log file may contain information stating that the reason for the software application to experience an error. Thus, the log file may be accessed to identify whether a crash exists. Data analytics techniques may be applied to the log file to determine the steps performed by the user and the application prior to the crash that caused the crash. As another example, user inquiry data may be analyzed, such as based on keywords, to identify any prior complaints of the user with the software application. The license data may be used to determine the version and edition of the application being used by the user.

The various items of information may be combined to predict one or more problems of the user. For example, known errors about version and edition of the software application may be combined with update information from the log files to determine whether the user has installed updates that correct the known errors. If the user has not installed the updates, then the analytical engine may predict that the known error is the problem and the correction is to install the updates. By way of another example, each item of data may have a predicted problem associated with the item. In the example, a log file may indicate a particular possible problem, and the user inquiry data may separately indicate another possible problem. If the predicted problems are the same, then the analytical engine may determine that the predicted problem is accurate.

In at least some embodiments, the analytical engine may order predicted problems based on a confidence value assigned to the prediction. In the above example of the log file and user inquiry data predicting the same problem, the confidence value for the predicted problem is higher than the confidence value assigned to each problem when the log file and user inquiry data indicate different problems. Further, the confidence value may be greater for more recent data and for known errors that are not corrected. Thus, if the log file is older than the user inquiry data, then the predicted problem for the log file may have a lower confidence value than the predicted problem for the user inquiry data. Various heuristics may be applied to determine the confidence value for each predicted problem in accordance with one or more embodiments of the invention.

In Step 250, one or more user data messages addressing the problem of the user may be generated by the application server. In one or more embodiments of the invention, each predicted problem have a corresponding problem identifier. From the problem identifier, a user data message may be obtained. The user data message may be pre-generated. In some embodiments, the user data message is a template that has fields, which are automatically populated by the message generator to be specific to the user. In one or more embodiments of the invention, each user data message may be assigned a priority value. The assignment may be based, for example, on the confidence value and the degree of severity of the predicted problem. The degree of severity is defined by a severity value specifying the importance to solving the problem. For example, a predicted problem that has a medium confidence value, but causes the software to not execute (i.e., high severity value) may have a higher priority value than a predicted problem that has a high confidence value, but is only annoying to the user (i.e., low severity value).

In Step 260, presentation of the user data messages may be initiated. In one or more embodiments of the invention, the user data messages are presented in the same medium as the call. For example, if the call is a voice call, the user data messages are presented by playing a voice recording. By way of another example, if the call is a chat, the user data message may be presented by displaying the chat. Further, the user data message may be presented in order of the priority value.

In one or more embodiments, for example, the user data messages may inform the user that they are using an out of date version of a software application, and the crash of the software application that the user is experiencing is resolved in the new version of the software application. The user data message may also prompt the user if they would like a link to the webpage of the updated software application where the user may download the update. If the user inputs, for example, a 1 on his/her push-button phone, the application server may send an email or other message including a link to the webpage of the updated software application.

In one or more embodiments of the invention, Steps 230-260 may be performed while the user is in the call queue. In other words, while the user is in the call queue, the system may retrieve and analyze the user data, predict problem and present one or more user data messages for each problem. Thus, the user may remain in the same relative position to other users in the queue while at the same time receiving information that is particular to the user and may solve the user's problem. In other words, the user is transferred to the call center agent at approximately the same time as if the user were not listening to personalized messages. Thus, by receiving the personalized messages while in the call queue, the user does not lose their place in line and may have their problem solved. Further, the user is not wasting time being on hold in the call queue and may end the call prior to speaking with the call center agent.

FIG. 3 shows a flowchart in accordance with one or more embodiments for a method for providing messages to a user on hold during a call in accordance with one or more embodiments of the invention. In particular, FIG. 3 shows a more detailed flowchart than FIG. 2. In Step 300, a call center may receive a call from a user. In Step 310, a unique identifier of the user may be retrieved. Steps 300 and 310 may be performed in a same or similar manner to Steps 200 and 210.

In Step 320, a determination is made whether a call center agent is available to speak with the user calling in to the call center. If a call center agent is available, then the process proceeds to Step 325. If a call center agent is not available, then the process proceeds to Step 330.

In Step 325, the user calling in to the call center is connected to a call center agent, and the user is able to speak with the call center agent to resolve the problem the user has with the software application.

In Step 330, the user may be placed into a call queue managed by a call manager. For example, if the number of users calling in to the call center exceeds the number of available call center agents to tend to the users, one or more users may be placed into the call queue. In Step 340, user data describing the user's prior interaction with a software application is retrieved based on the unique identifier. In Step 350, the user data is analyzed to identify a problem of the user based on the prior interaction. In Step 360, one or more user data messages addressing the problem of the user may be generated by the application server. In Step 370, presentation of the user data messages may be initiated. Steps 330-370 may be performed in a same or similar manner to Steps 220-260 of FIG. 2.

In Step 380, before, during, or after presentation of the user data messages is initiated, a determination is made whether the user is still on hold within the call queue. In other words, the system may continually determine the next user in the call queue when a call center agent completes a call with a prior user. Thus, the system may initiate generating the user data messages and not present the user data messages. By way of another example, the system may be in the process of presenting user data messages. If the user is still waiting within the call queue after presentation of the user data messages is initiated and the call center agent is available, the user may still wish to speak with a call center agent. If the user is still waiting within the call queue, then the process proceeds to Step 381. If the problem of the user has been resolved and/or the user ends the call, the process ends.

In Step 381, a determination is made whether a call center agent is available to speak with the user calling in to the call center. If a call center agent is not available, then the process proceeds to Step 383. If a call center agent is available, then the process proceeds to Step 385.

In Step 383, the user data messages continue to be presented to the user in accordance with one or more embodiments. Presenting the user data messages may be performed in a same or similar manner discussed above with reference to Step 260.

In Step 385, the user is removed from the call queue and connection to a call center agent is initiated in accordance with one or more embodiments. In other words, the user is transferred to the call center agent that is available. Because the user remains in the call queue prior to the transfer, the user does not lose time or place in line by receiving the personalized messages.

In Step 387, the user calling in to the call center is connected to a call center agent, and the user is able to speak with the call center agent to resolve any problem the user may be facing with the software application or product.

FIG. 4 shows a flowchart in accordance with one or more embodiments for a user to receive messages while on hold during a call. In Step 400, a user may place a call to call center. In other words, when the user has a problem, the user may contact the call center via telephone, Internet chat or any other technique. In Step 410, a determination is made whether the user has been connected to a call center agent. For example, if a call center agent is available, the user may be connected to the call center agent and process proceeds to Step 415. If a call center agent is not available then the process proceeds to Step 420, and the user may be placed into a call queue. The user may receive a message indicating that the user is placed in the call queue.

In Step 415, the user calling in to the call center is connected to a call center agent, and the user is able to speak with the call center agent to resolve any problem the user may be facing with the software application or product.

In Step 420, the user may be placed into a call queue, and the user listens, views or otherwise receives the user data messages being presented to the user. In Step 430, a determination is made whether the user is still on hold within the call queue. If the user is still waiting within the call queue, then the process proceeds to Step 435. If the problem of the user has been resolved and/or the user ends the call, the process ends. In Step 435, the user is removed from the call queue and connection to a call center agent is initiated in accordance with one or more embodiments. The user calling in to the call center is connected to a call center agent, and the user is able to speak with the call center agent to resolve any problem the user may be facing with the software application.

Figure 5:
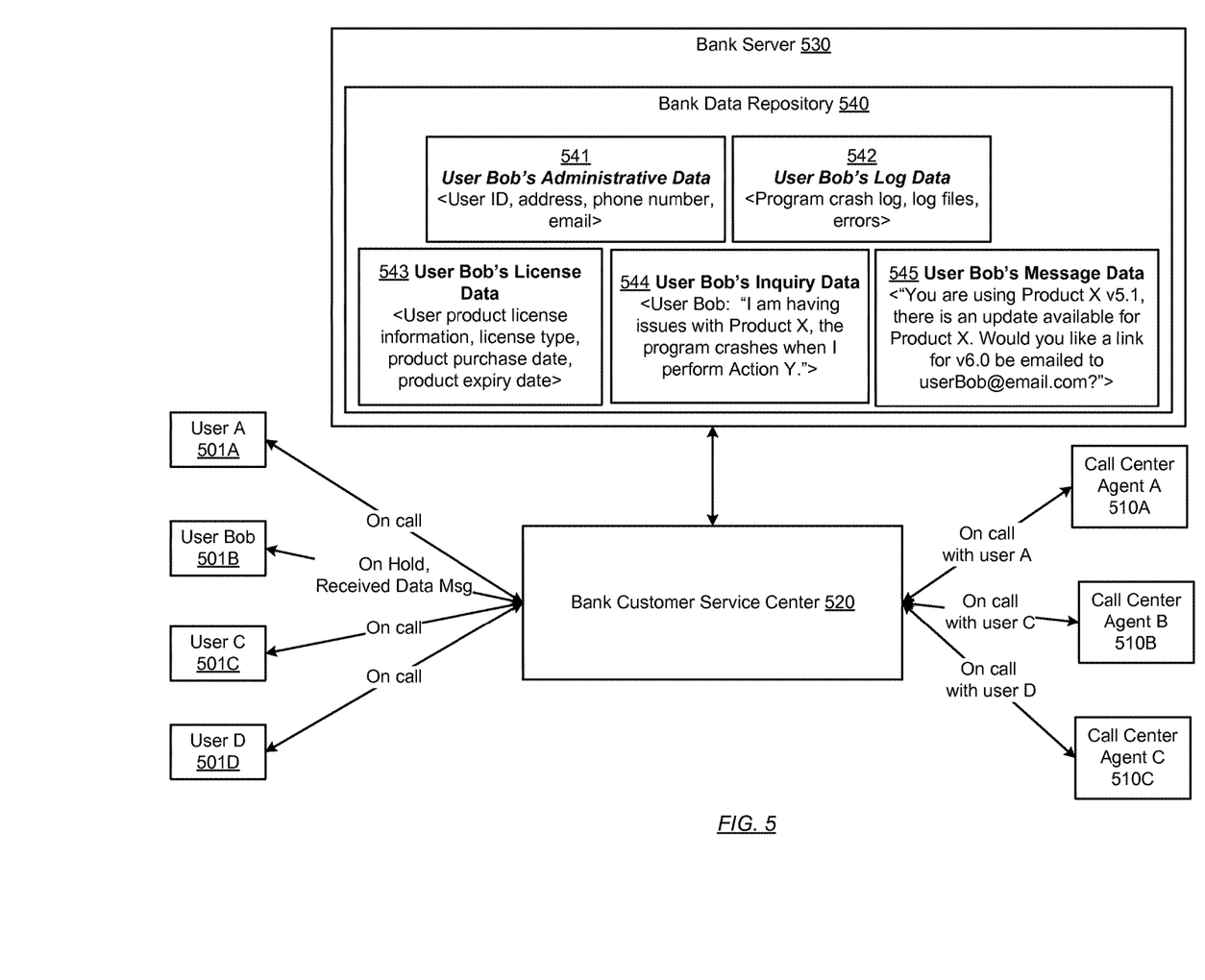
FIG. 5 shows an example in accordance with one or more embodiments of the invention.

FIG. 5 shows an example in accordance with one or more embodiments for providing messages to a user on hold during a call. The following example is for explanatory purposes only and not intended to limit the scope of the invention. For the purposes of the example only, consider the scenario in which a user Bob (501B), along with various other users (e.g., User A (501A), User C (501C), and User D (501D)), have called in to a bank customer service center (520). The bank customer service center (520) may be operatively connected to and have the capability of sharing and receiving data with various call center agents (e.g., call center agent A (510A), call center agent B (510B), call center agent C (510C)) and a bank server (530) storing a variety of data within a bank data repository (540). The bank data repository (540) stores data for various customers of the bank. In this example, the bank data repository (540) stores various data associated with user Bob (501B), such as user Bob's administrative data (541), log data (542), license data (543), inquiry data (544), and message data (545).

Upon calling in to the bank customer service center (520), user A (501A) is connected to speak with call center agent A (510A), user C (501C) is connected to speak with call center agent B (510B), and user D (501D) is connected to speak with call center agent C (510C), while user Bob (501B) is placed in a call queue due to no other call center agents being available at that time. Once user Bob (501B) calls in to the bank customer service center (520), the bank customer service center (520) identifies the phone number that user Bob (501B) is calling from, and searches through various data within the bank server (530), such as user Bob's administrative data (541), for a matching phone number. Since user Bob's (501B) phone number is stored in user Bob's administrative data (541), the bank customer service center (520) is able to use user Bob's (501B) phone number as a unique identifier of the user, and retrieve various data pertaining to user Bob's unique customer identifier.

While user Bob (501B) is in the call queue, an analytical engine (not shown) within the bank server (530) analyzes various data pertaining to user Bob (501B), such as program crash log, log files, and/or errors within user Bob's log data (542), user Bob's product license information, license type, product purchase date, and/or product expiry date within user Bob's license data (543), and one or more inquiry messages provided by user Bob, including a message stating that user Bob is having issues with Product X, and that Product X crashes when he performs Action Y, which is stored in user Bob's inquiry data (544).

Upon analyzing user Bob's data, the analytical engine (not shown) identifies a problem user Bob may be having with the software application. For example, the analytical engine detects that user Bob is using an outdated software version based on product license data stored in user Bob's license data (543). As a result, the message generator (not shown) within the bank server (530) generates one or more messages and stores them in user Bob's message data (545).

While user Bob is waiting in the call queue, presentation of the messages is initiated, and user Bob listens to the messages. One of the messages states, "You are using Product X v5.1, there is an update available for Product X fixing incompatibility issues with prior versions. Would you like a link for v6.0 be emailed to userBob@email.com?" In response, user Bob vocalizes "yes" into the phone to request the link, and the link is sent to user Bob's email address.

User Bob checks his email on his computer and accesses the link provided to him by the bank server (530). After downloading and installing the update, user Bob finds he is able to perform Action Y without Product X crashing or freezing, and that his problem with the software application is resolved. User Bob is satisfied with the information provided by the user data messages, and no longer requires any further customer service. User Bob ends the call and frees up his position in the call queue, resulting in a decreased wait time for other users in the call queue who still wish to speak with a call center agent.

Figure 6:
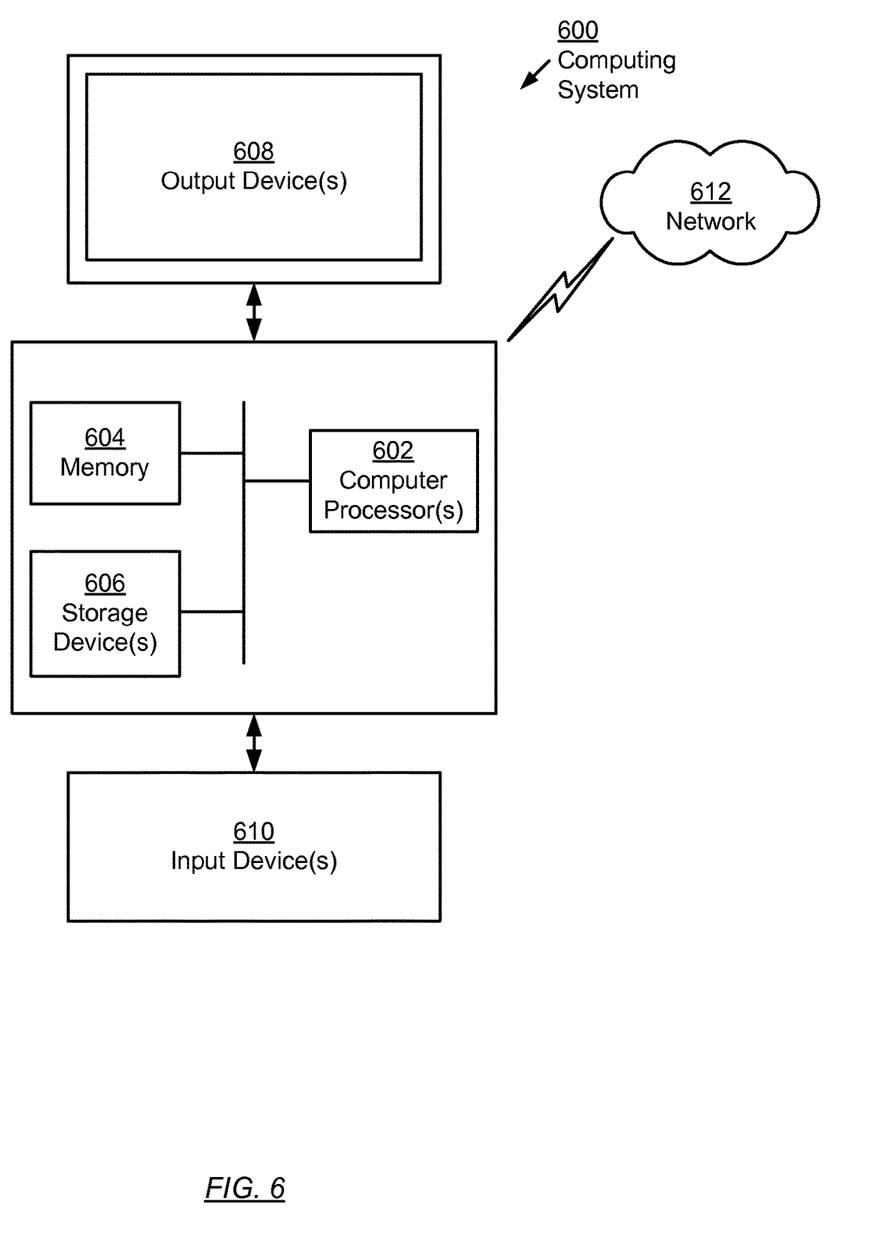
FIG. 6 shows a computing system in accordance with one or more embodiments of the invention.

Embodiments of the invention may be implemented on a computing system. Any combination of mobile, desktop, server, embedded, or other types of hardware may be used. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and connected to the other elements over a network (612). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for providing messages to a user during a call comprising:
 receiving the call from the user;
 retrieving, based on the call, a unique identifier of the user;
 placing the user in a call queue in an order defined by when the call is received; and
 while the user is in the call queue:
  retrieving a plurality of user data matching the unique identifier of the user, wherein the plurality of user data includes a log file that describes an error that occurred with a software application during use of the software application by the user,
  analyzing the plurality of user data to identify, based on the error in the log file, a plurality of problems of the user with the software application,
  generating, in response to identifying the plurality of problems of the user, a plurality of user data messages, wherein at least one of the plurality of user data messages addresses at least one of the plurality of problems of the user,
  applying, based on a similarity between the plurality of problems, a confidence value to each problem of the plurality of problems,
  assigning, based on the confidence value, a priority value to each of the plurality of user data messages, wherein the priority value numerically orders the plurality of user data messages, and
  initiating, in accordance with the priority value, presentation of the plurality of user data messages to the user.

2. The method of claim 1, wherein the priority value is further based on a severity value of each of the plurality of problems.

3. The method of claim 1, further comprising:
 determining that the user is in the call queue after initiating the presentation of the plurality of user data messages to the user;
 removing the user from the call queue; and
 connecting the user to a call center agent.

4. The method of claim 3, wherein removing the user from the call queue interrupts the presentation of the plurality of user data messages.

5. The method of claim 1, wherein the analyzing comprises data mining of the plurality of user data from a plurality of data servers.

6. The method of claim 5, wherein the data mining comprises accessing a log data server to obtain the log file describing the error that occurred with the software application, and determining that the error that occurred with the software application is a problem of the user.

7. The method of claim 5, wherein the data mining comprises analyzing user inquiry data to identify a past problem of the user.

8. A system for providing messages to a user during a call comprising:
 a call center system configured to:
  receive the call from the user,
  retrieve, based on the call, a unique identifier of the user, and
  place the user in a call queue in an order defined by when the call is received; and
 an application server operatively connected to the call center system and configured to:
  while the user is in the call queue:
   retrieve, a plurality of user data matching the unique identifier of the user, wherein the plurality of user data includes a log file that describes an error that occurred with a software application during use of the software application by the user,
   analyze the plurality of user data to identify, based on the error in the log file, a plurality of problems of the user with the software application,
   generate, in response to identifying the plurality of problems of the user, a plurality of user data messages, wherein at least one of the plurality of user data messages addresses at least one of the plurality of problems of the user,
   apply, based on a similarity between the plurality of problems, a confidence value to each problem of the plurality of problems,
   assign, based on the confidence value, a priority value to each of the plurality of user data messages, wherein the priority value numerically orders the plurality of user data messages, and
   initiate, in accordance with the priority value, presentation of the plurality of user data messages to the user.

9. The system of claim 8, wherein the application server comprises:
 a data repository comprising user data.

10. The system of claim 9, wherein the user data comprises user administrative data, log data, license data, marketing data, message data, and user inquiry data.

11. The system of claim 8, wherein the call center system comprises a call manager and a call queue.

12. A non-transitory computer readable medium for providing messages to a user during a call, the non-transitory computer readable medium comprising computer readable program code for:
 receiving the call from the user;
 retrieving, based on the call, a unique identifier of the user;
 placing the user in a call queue in an order defined by when the call is received; and
 while the user is in the call queue:
  retrieving a plurality of user data matching the unique identifier of the user, wherein the plurality of user data includes a log file that describes an error that occurred with a software application during use of the software application by the user,
  analyzing the plurality of user data to identify, based on the error in the log file, a plurality of problems of the user with the software application,
  generating, in response to identifying the plurality of problems of the user, a plurality of user data messages, wherein at least one of the plurality of user data messages addresses at least one of the plurality of problems of the user,
  applying, based on a similarity between the plurality of problems, a confidence value to each problem of the plurality of problems,
  assigning, based on the confidence value, a priority value to each of the plurality of user data messages, wherein the priority value numerically orders the plurality of user data messages, and
  initiating, in accordance with the priority value, presentation of the plurality of user data messages to the user.

13. The non-transitory computer readable medium of claim 12, wherein the priority value is further based on a severity value of each of the plurality of problems.

14. The non-transitory computer readable medium of claim 12, further comprising computer readable program code for:
   determining that the user is in the call queue after initiating the presentation of the plurality of user data messages to the user;
   removing the user from the call queue; and
   connecting the user to a call center agent.

15. The non-transitory computer readable medium of claim 14, wherein removing the user from the call queue interrupts the presentation of the plurality of user data messages.

16. The non-transitory computer readable medium of claim 12, wherein the analyzing comprises data mining of the plurality of user data from a plurality of data servers.

* * * * *